United States Patent [19]

Ewers

[11] 4,134,707
[45] Jan. 16, 1979

[54] WIND TURBINE APPARATUS

[76] Inventor: Marion H. Ewers, P.O. Box 526, La Veta, Colo. 81055

[21] Appl. No.: 791,100

[22] Filed: Apr. 26, 1977

[51] Int. Cl.² .............................................. F03D 7/00
[52] U.S. Cl. ........................................ 415/4; 290/55
[58] Field of Search ...................................... 415/2–4, 415/60; 290/54, 55

[56] References Cited

U.S. PATENT DOCUMENTS

| | | | |
|---|---|---|---|
| 1,640,269 | 8/1927 | Ellison | 415/2 |
| 1,810,113 | 6/1931 | Schlotzhauer | 415/2 |
| 1,974,008 | 9/1934 | Biehn | 415/2 |
| 2,032,651 | 3/1936 | Donovan | 415/2 |
| 2,059,356 | 11/1936 | James | 415/2 |
| 2,431,111 | 11/1947 | Dubrie | 415/2 |

FOREIGN PATENT DOCUMENTS

| | | | |
|---|---|---|---|
| 535624 | 10/1931 | Fed. Rep. of Germany | 415/2 |
| 2405767 | 8/1975 | Fed. Rep. of Germany | 415/3 |
| 513279 | 2/1955 | Italy | 415/2 |

Primary Examiner—C. J. Husar
Attorney, Agent, or Firm—Charles E. Cates

[57] ABSTRACT

The Specification discloses a segmented wind turbine which can be added to incrementally to increase the driving force and power generation of the machine. By this means the smaller diameter rotors that are more easily handled and that put the minimum of stress on the wind turbine apparatus can be used in series to achieve the power output desired. Each segment has a venturi means incorporated into the elements of the apparatus to enhance the apparent wind speed. Also disclosed are novel means for operatively supporting the moving parts of the apparatus.

In a preferred embodiment an exoskeletal frame is made in segments that can be stacked one upon the other. Each segment of frame has arms which converge inwardly toward the axial center of the apparatus. There a hoop connects the ends of the inwardly converging arms and defines an axial aperture. Inside this axial aperture a segment of drive shaft and a concentric collar are supported by thrust bearings which are in turn supported by the concentric hoop attached to the arms of the frame. Each set of arms and the associated bearings support the drive shaft, a rotor on the drive shaft, and a wind shield surrounding the rotor immediately above the arms. The wind shield is of a novel structure, having two spaced side walls which define openings for receiving wind through the rotors and discharging the wind. One of the walls forms a venturi with the rotor.

15 Claims, 6 Drawing Figures

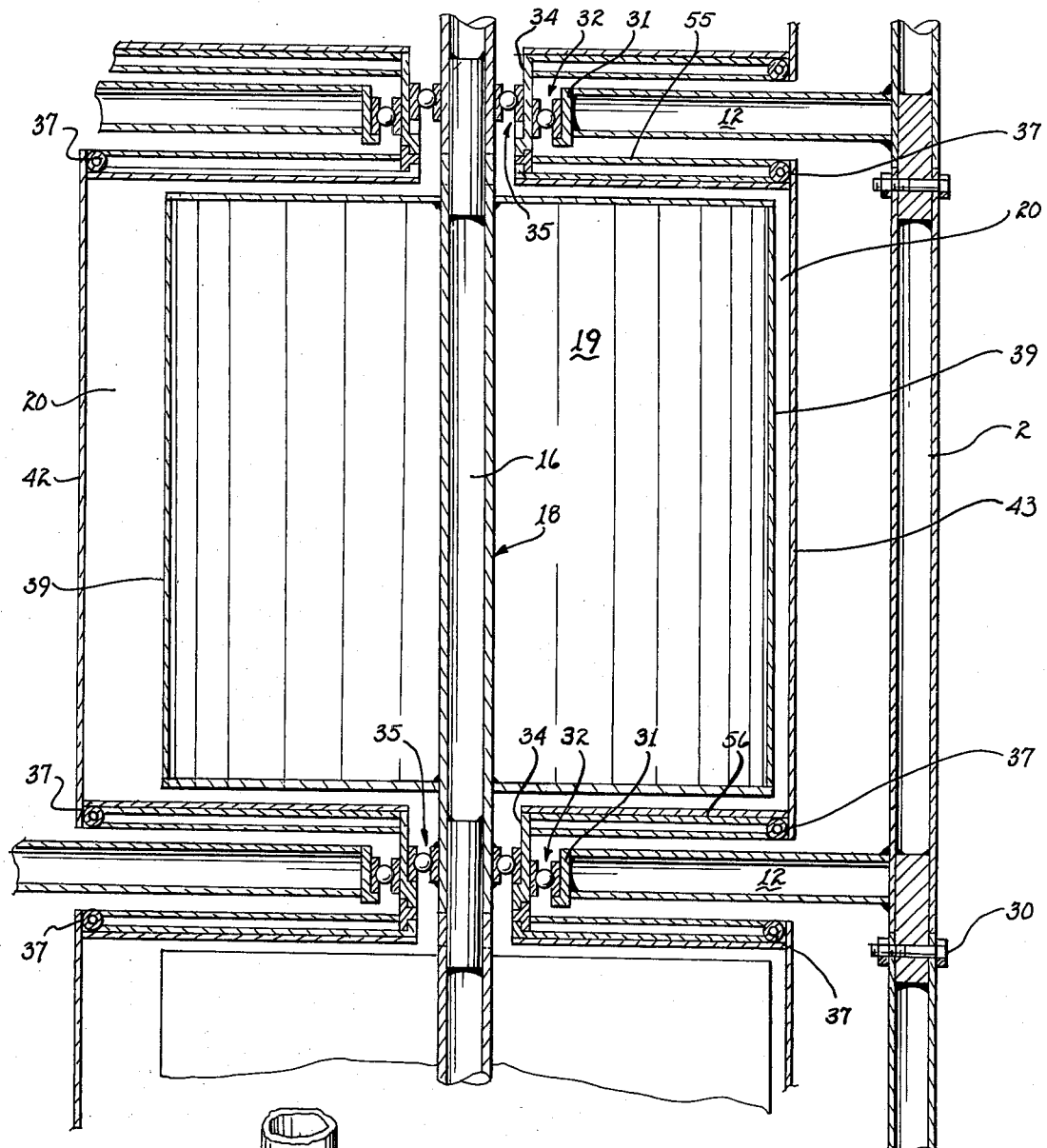
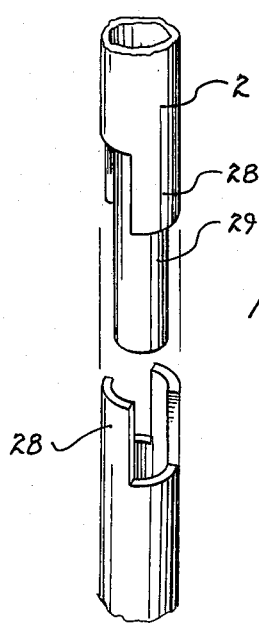
fig. 5
fig. 6

WIND TURBINE APPARATUS

BACKGROUND OF THE INVENTION

This invention relates to windmills, particularly to windmills of the turbine type, and improvements thereon.

The art of making windmills and wind turbines is an ancient one. However, there has always been the problem of obtaining power in great quantities and lesser quantities as desired for particular uses without making the apparatus cumbersome or expensive or too complex, such as for example, one that has too many working parts which might malfunction. Another problem has been that windmills tend to take up too much space; furthermore, they are for the most part unsightly and, therefore, subject to objection on that account. Another serious problem is that prior art windmills using production run parts are not readily adaptable to many different specific situations.

BRIEF SUMMARY OF THE INVENTION

With the object of overcoming the aforementioned disadvantages and the further object of improving upon the existing wind turbines available to industry I have devised an improved wind turbine apparatus which is fashioned in discrete segments which may be joined together to form a unitary whole of desired differing performance capabilities.

Each segment has a frame with means for supporting a vertical drive shaft carried by the frame; a collar concentrically disposed around the drive shaft and rotatable independently of the drive shaft; a rotor carried by the shaft, and a wind shield carried by the collar. I further provide means for adjusting the position of the shield relative to the blades of the rotor for the purpose of governing the speed of the rotor.

The frame may take the form of a plurality of standards disposed radially outward of the rotor and shield. Means for supporting the shaft and the collar may conveniently be a plurality of radially inwardly stretching arms which terminate in bearings, which may be thrust bearings, disposed within the hoop and enclosing the collar and the drive shaft. Both the collar and the shaft rotate independently of each other. The bearings secure and support the shaft and the collar.

In another aspect the apparatus may be considered as comprising a frame, a drive shaft rotatably carried by the frame, a rotor carried by the shaft and a wind shield rotatably and concentrically supported around the rotor. The shield has a pair of side walls which are spaced apart to form wind receiving and discharging openings between the side walls. One of the side walls in cooperation with the rotor defines a venturi. Each of these segmented parts may also, of course, be stacked one upon the other to an indefinite height, as desired.

From another view point the wind turbine apparatus may be considered a vertically rising segmented exoskeletal frame, each segment of which has at least two vertically spaced sets of radially converging ribs, means defining an axial opening connecting those ribs, a vertical drive shaft disposed on the axial opening, a collar concentrically disposed around the shaft within the axial opening, means for rotatably supporting the shaft and the collar within the axial opening, a wind shield carried by said collar, and a rotor carried by the shaft between the vertically spaced sets of radially converging arms.

The shield as before described, is made with a first wall and a second wall which define wind receiving and discharging openings between those walls and venturi means formed by one of the walls and the blades of the rotor. The first wall conveniently is made with ends which flare outwardly from the rotor, the main part of the wall following closely the arc defined by the passage of the tips of the rotor. The rotor may take a number of different forms. Conveniently the blades may be saw toothed in cross section. The rotor may then have a top and a bottom panel which in cooperation with the teeth form pockets for capturing the wind.

It is also advantageous to have the second of said walls flare outwardly on the lee (downwind) side of the apparatus.

In this version the means for rotatably combining the shaft and the collar are two concentrically disposed sets of anti-friction bearings, conveniently thrust bearings, the outer set of which is rotatably supported by the hoop (which connects the radially converging arms) and the collar, the inner set of which rotatably connects the collar and the shaft. The collar may be integrally formed with the wind shield.

In all cases the segments are provided with means for vertically extending the shaft and the frame to carry a plurality of rotors, wind shields, and other associated elements to provide additional turbine power. This means may take the form of reciprocally mating ends which may be optionally secured by bolts, by welding, or by other suitable means. Preferably the securing means should be detachable so that the apparatus can be adjusted for changing conditions without undue trouble and expense.

Also any suitable means for governing the speed of the apparatus or stopping it all together may be provided.

DETAILED DESCRIPTION OF THE PREFERRED EMBODIMENTS

Turning now to the drawings in which a presently preferred embodiment of the invention is illustrated:

FIG. 5 is a view, in section, of the device as shown in FIG. 3 along the lines 5—5; and FIG. 6 is an exploded view of a portion of the drive shaft where two segments thereof are joined together.

Figure 1:
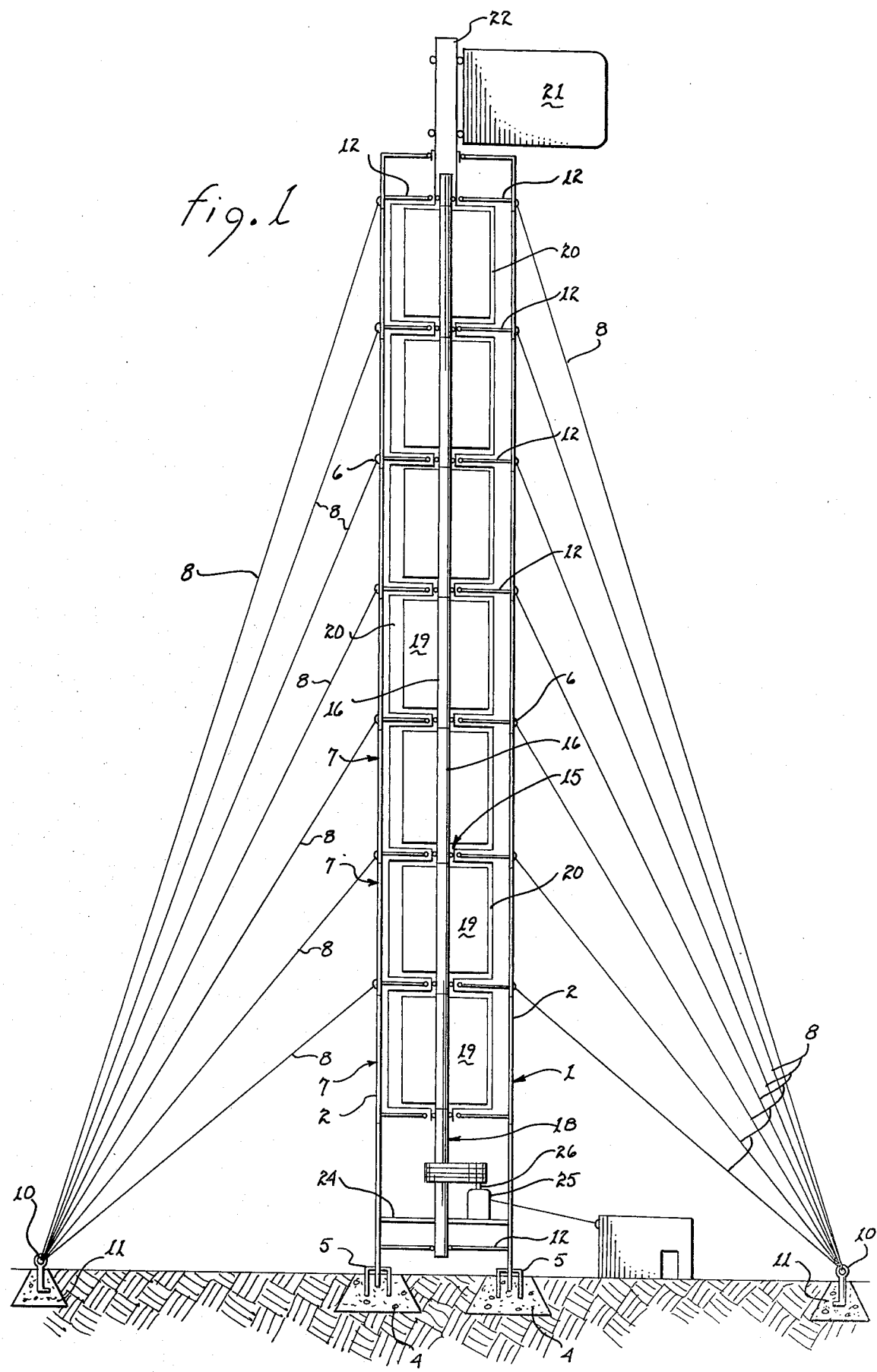
FIG. 1 is an elevation view of a wind turbine apparatus in section, constructed according to the principles of this invention.

Referring now to FIG. 1, the frame is generally indicated at 1. Although not readily apparent in FIG. 1 because two of the standards are omitted for the purposes of illustration, there are in this preferred embodiment four standards 2 which serve as an exoskeletal frame disposed on a perimeter around the moving parts of the apparatus.

In this preferred embodiment the standards are firmly embedded in buried concrete anchors and braced by U-shaped support members 5 which are also embedded in the concrete anchors and attached to the standards. Attached to the bottom of each segment 7 is a guy wire 8 secured at one end to an eye bolt 10 firmly embedded in a concrete pedestal 6 and another end of a welded metal eye 6. There are four sets of these guy wires for each segment 7, one at each standard 2.

Converging radially inward from the standards 2 are arms or ribs 12. There are four of these arms per segment 7 and at an axial circle they meet and are joined together by a hoop (best seen in FIG. 3) which provides means for supporting other elements, said means being generally indicated at 15.

Concentrically disposed within the segments 16 is the drive shaft, generally indicated as 18. Each drive shaft segment supports a rotor 19 which is concentrically enclosed, but only partially, by a wind shield 20.

A main wind tail 21 is rotatably carried by an extension 22 of the topmost shield segment 20. Referring to the bottom of the frame, there is a platform 24 affixed to the standards 2, and the platform carries a generator 25. Power is taken off the drive shaft 16 by conventional means, as in this case, a belt and pulley arrangement disposed around the drive shaft 16 and the axle 26 of the generator. The lowest set of converging arms is somewhat different from the other set in having means within which the lowest segment of the shaft only is rotatably journaled.

Figure 4:
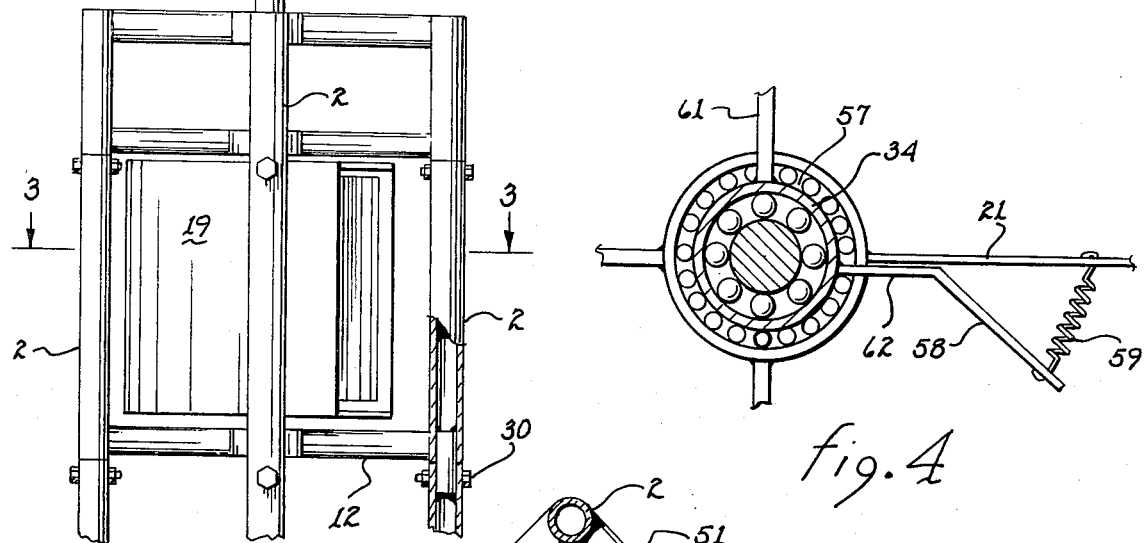
FIG. 4 is a view, in section, of the governing apparatus shown in FIG. 2 along the lines 4—4.

Taking a closer look at the details of construction of the individual segments 7 attention is called to FIG. 4 wherein an enlarged segment taken from the views of FIG. 1 is shown in great detail. The standards 2 are tubular steel and briefly referring to FIG. 6 the details of the joining of standards between segments may be seen. In this preferred embodiment portions of the ends of each segment are cut away so that protruding sections 28 dove-tail with their opposite members. A section of smaller diameter pipe 29 is inserted in one of the sections and retained at one end by welding. When the sections are joined together holes in the one segment and the smaller diameter pipe are broached to receive a bolt 30. A similar joinder of the segments of the drive shaft 18 is also accomplished. However, the means for joining either is not critical and number of alternative means may occur to persons ordinarily skilled in the art. The standards 2 are strengthened by braces 9 tieing them together, welded at the joints.

The inwardly converging arms 12 are attached by welding. The converging ends are joined by a hoop 14. A thrust bearing assembly 32 employs a precision ball bearing with high thrust and radial load bearing capacity which may be obtained from TRF Company. The bearing is sealed with life-time lubrication provided. The bearing joints the hoop 14 with collar 34. A second thrust bearing 35 of like capacity rotatably joins the collar to the drive shaft 18.

The rotor 19 is generally indicated in FIG. 5 as is the wind shield 20. A feature of the wind shield is the arcuate bracing pipes 37 which lend strength to the sidewall 38 of the wind shield.

Figure 3:
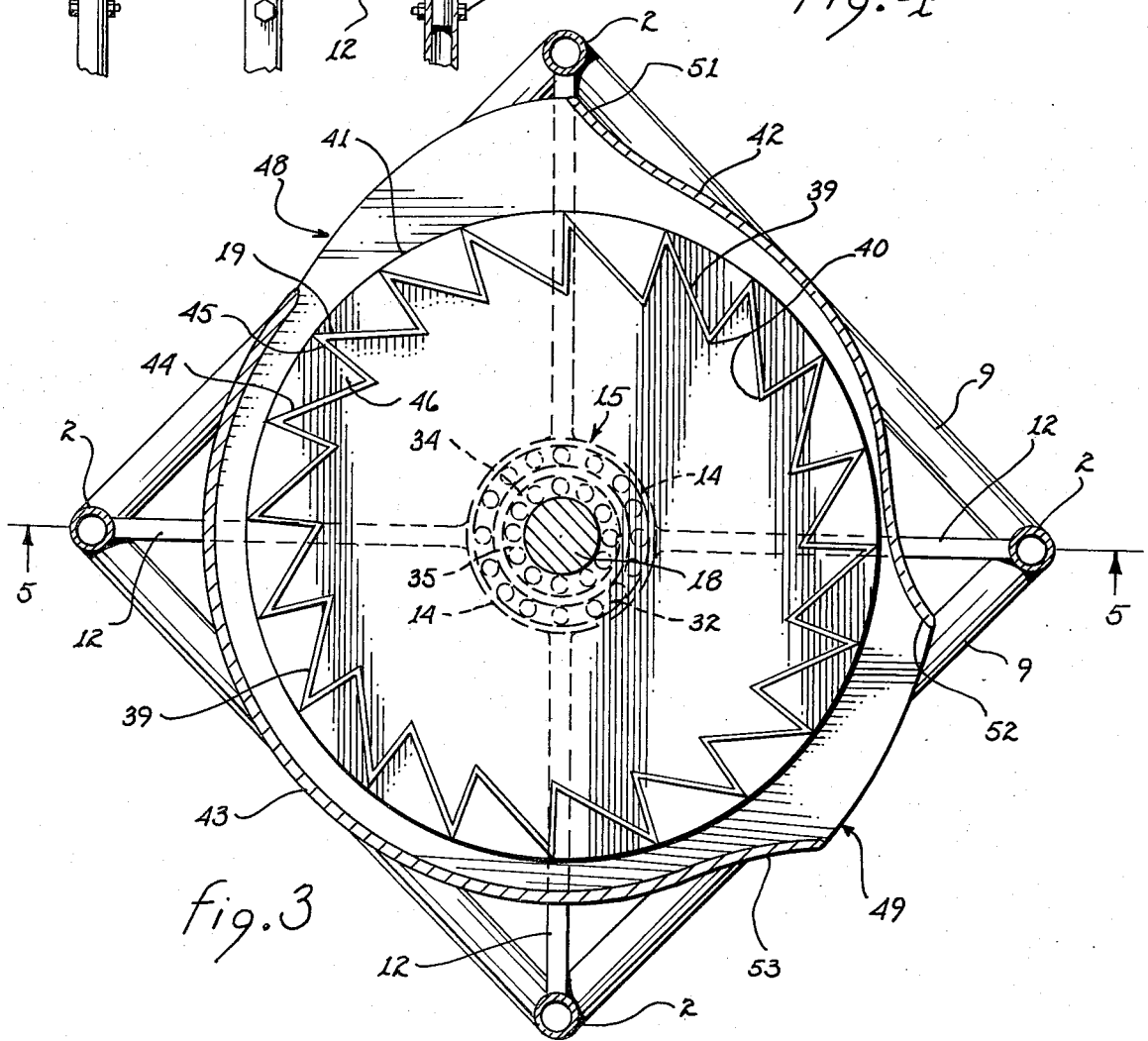
FIG. 3 is a view, in section, of the turbine segment shown in FIG. 2 along the lines 3—3.

Referring now to FIG. 3 wherein certain details of the rotor 19 and wind shield 20 are shown, the rotor which is shown in cross section has blades 39 formed of sheet steel which are welded as at 40 to join the blades in a circular configuration. They are strengthened and held rigid by means of top and bottom panels, the perimeter of which defines the circle 41 made by the tips of the blades 39 as they move. The top and bottom plates cooperate with the faces 44 and 45 of the blades 39 to form a pocket 46 to better catch the wind. The rotor is welded to the drive shaft 18 and thereby rotates the shafts in response to the movements of the rotor.

The wind shield 20 has a first sidewall 42 and a second sidewall 43, both of which are made of sheet steel. The first sidewall 42 and the spaced second sidewall 43 form two openings: a wind receiving opening 48 and a wind discharging opening 49. The first sidewall 42 also forms a venturi with the blade 39 of the rotor. As seen in FIG. 3 the windward end 51 and the leeward end 52 of the sidewall 42 are flared outwardly. The sidewall which is spaced a considerable distance from the rotor at the windward end 51 closely approaches the blades 39 near the leeward end. The leeward end 53 of the second sidewall 43 is also flared outwardly.

Referring now to FIG. 5, the spacing of the first wall at the windward end 53 from the blade 39 may be contrasted with the spacing of the second wall 43 from the blade 39. It will be noted that both walls of the shield 20 are supported in part and made rigid by bracing pipes 37 and by roof 55 and floor 56 which are, in turn, fastened to the collars 34, all of which can be accomplished suitably by welding as in this case.

Figure 2:
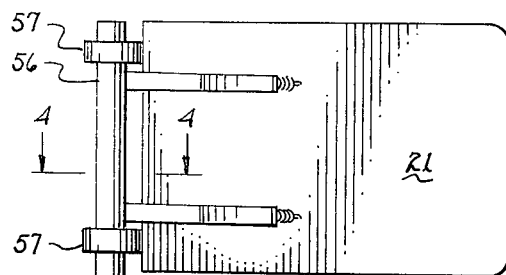
FIG. 2 is a detail view of the topmost segment of the wind turbine tower with its associated tail.

Further details of the governing apparatus used in this preferred embodiment are disclosed in FIG. 4 and in FIG. 2. An extension 56 of the collar 34 rises above the last segment and rotatably supports the main tail 21. The main tail rotates independently of the movement of the collar. This is accomplished by means of bearing assembly 57. A stop member 58 is welded to the collar 34 and is attached to the main tail by spring 59. A governing tail 61 is also welded to the extension of the collar at an angle of 90 degrees from the base leg 62 of the stop member 58. The size of the main tail and the governing tail may be adjusted to accommodate the particular conditions.

The size of the main tail 21 and the governing tail 61 may be adjusted to accommodate particular conditions. Alternatively, the spring tension between the stop member 58 and the main tail 21 may be adjusted, as by adding a spring of preset tension for each rotor used. Thus, one size tail may be used and the adjustment for differing numbers of rotors can be made by means of the number of springs used.

There are a number of advantages to this construction. Among other things, any number of shields and rotors can be added in series. Each segment employs a small diameter rotor which will accommodate high speeds quite easily. The construction of the wind turbine is very sturdy, particularly with the guy wires provides on four sides to each segment.

Another worthwhile advantage is that many units can be closely spaced around a given facility. For example, a power generating facility or a pump for a reservoir.

Another significant advantage is that the venturi formed by the shield and rotor augments the apparent speed of the wind. The rotor blade configuration reduces drag in stream lines. The wind exhaust is facilitated by the flare of the shield walls of the leeward side. To some extent the shield itself provides a governing action because the first wall 42 of the shield 20 is offset from the center of the axis.

In operation the main tail 21 guides the wind receiving opening 48 into proper position facing the wind for maximum exposure of the optimum rotor blade area. As the wind rises the shield moves in response to the governer in a clockwise position (looking down) to cover part of the optimum area of the blade. In time the force of the wind on the governer tail, causing the movement of the shield to cover certain parts of the blades, brings the two competing factors into equilibrium. This equilibrium, of course, changes with the variation of the wind speed.

In the event that it is desired to shut the unit down, the shield can be moved manually or with the aid of tools to cover the operative part of the blades. If desired, auxiliary devices for the purpose known to the art may be supplied.

If the need for servicing the rotor arises, the second wall 43 can be removed and the rotor inspected or removed for repairs. In normal operation the segments of the shaft are not joined together but are maintained as an integral unit by the weight of the units above. The tower can be assembled with the aid of a small crane or disassembled in the same way. Also certain segments of the tower can be removed with the aid of a small crane by lifting the segments above and removing the shaft and associated rotor. The need for this should be rarely encountered however.

The foregoing preferred embodiment being exemplary only, the invention is intended to include all obvious variations and is to be governed by the appended claims.

What is claimed is:

1. A wind turbine apparatus comprising:
a vertically rising exoskeletal frame having at least two vertically spaced sets of radially converging ribs, means defining an axial opening connecting said ribs, a vertical drive shaft disposed in said axial opening, a collar concentrically disposed around said shaft within said axial opening, means for rotatably supporting said shaft and said collar within said axial opening; a wind shield carried by said collar, and a rotor carried by said shaft between said vertically spaced sets of radially converging ribs.

2. The apparatus of claim 1 wherein said shield comprises a first wall, a second wall, wind receiving and discharging openings between said walls, and venturi means defined by the one of said walls and the blades of said rotor.

3. The apparatus of claim 2 wherein the ends of said first wall flare outwardly of said rotor.

4. The apparatus of claim 2 wherein the rotor blades are saw toothed in cross-section.

5. The apparatus of claim 3 wherein said second wall flares outwardly on the lee side.

6. The apparatus of claim 1 wherein the means for rotatably confining said shaft and said collar comprise two concentrically disposed sets of anti-friction bearings, the outer set of which rotatably connects said means for connecting said radially converging ribs and said collar, the inner set of which rotatably connects said collar and said shaft.

7. The apparatus of claim 1 wherein the means for connecting said converging arms comprises a hoop attached to the ends of said axially converging arms.

8. The apparatus of claim 1 wherein said collar is integrally formed with said wind shield.

9. The apparatus of claim 1 with the addition of means for vertically extending said shaft and said vertically rising frame to carry a plurality of said rotors, wind shields and associated elements to provide additional turbine power.

10. The apparatus of claim 9 wherein said means for vertically extending said frame and said shaft comprise reciprocally mating male and female ends.

11. The apparatus of claim 1 with the addition of means for governing the speed of said turbine.

12. A wind turbine apparatus comprising: a frame; a drive shaft rotatably carried by said frame; a rotor carried by said shaft; a wind shield rotatably and concentrically supported around said rotor, said shield comprising a pair of side walls defining wind receiving and discharging openings between said side walls, one of said side walls defining a venturi in combination with said rotor.

13. The apparatus of claim 12 in combination with means for vertically stacking a plurality of rotors.

14. A wind turbine apparatus comprising a vertically rising series of discrete segments, each segment comprising a frame, means carried by said frame for supporting a vertical drive shaft a drive shaft supported by said means, a collar concentrically disposed around said shaft and independently rotatable therefrom, a rotor carried by said shaft, a wind shield carried by said collar, and means for adjusting the position of said shield relative the blades of said rotor.

15. The apparatus of claim 14 wherein said frame comprises a plurality of standards disposed radially outward of said rotor and shield, and said means for supporting said shaft and collar comprises a plurality of inwardly stretching arms terminating in a hoop, and bearings operatively disposed within said hoop to rotatably secure and support said shaft and collar.

* * * * *